(12) United States Patent
Curbach et al.

(10) Patent No.: US 12,523,040 B2
(45) Date of Patent: Jan. 13, 2026

(54) RECEIVING STRUCTURE, TEXTILE-REINFORCED COMPONENT AND METHOD FOR PRODUCING THE COMPONENT

(71) Applicant: Maria Patricia Garibaldi, Hohenstein-Ernstthal (DE)

(72) Inventors: Manfred Curbach, Dresden (DE); Dominik Schlüter, Dresden (DE); Maria Patricia Garibaldi, Hohenstein-Ernstthal (DE); Iurii Vakaliuk, Dresden (DE)

(73) Assignee: Maria Garibaldi, Hohenstein-Ernstthal (DE)

( * ) Notice: Subject to any disclaimer, the term of this patent is extended or adjusted under 35 U.S.C. 154(b) by 733 days.

(21) Appl. No.: 17/762,799

(22) PCT Filed: Sep. 21, 2020

(86) PCT No.: PCT/EP2020/076255
§ 371 (c)(1),
(2) Date: Mar. 23, 2022

(87) PCT Pub. No.: WO2021/058426
PCT Pub. Date: Apr. 1, 2021

(65) Prior Publication Data
US 2022/0341168 A1  Oct. 27, 2022

(30) Foreign Application Priority Data
Sep. 23, 2019  (EP) .................................. 19198960

(51) Int. Cl.
*E04C 2/52* (2006.01)
*E04B 5/48* (2006.01)
(Continued)

(52) U.S. Cl.
CPC ................ *E04C 2/525* (2013.01); *E04B 5/48* (2013.01); *E04C 2/06* (2013.01); *E04C 5/073* (2013.01);
(Continued)

(58) Field of Classification Search
CPC ... E04B 5/48; E04B 5/326; E04C 2/06; E04C 2/525; E04C 5/073; H02G 3/38; H02G 3/185
See application file for complete search history.

(56) References Cited

U.S. PATENT DOCUMENTS 5,021,608 A * 6/1991 Hadfield ................ H02G 3/185
439/492
9,667,049 B1 * 5/2017 Gretz ..................... H02G 3/081
(Continued)

FOREIGN PATENT DOCUMENTS

CA       3119637 A1 * 11/2021  ............. H01R 27/02
DE    102005055770 A1    5/2006
(Continued)

*Primary Examiner* — Jessie T Fonseca
(74) *Attorney, Agent, or Firm* — Viering, Jentschura & Partner mbB

(57) ABSTRACT

The invention relates to a receiving structure (1) which is intended for casting into a matrix material and has at least one receiving element (4), which projects out of the receiving structure (1) in such a way that it can project into the matrix material. According to the invention, the receiving element (4) has in its interior a receiving space (6) which has an opening (10) facing the surface (94) of the component (90), through which opening (10) a functional module (60, 65, 70, 75, 80, 82, 84, 86, 88) can be guided for insertion into the receiving space (6), wherein the receiving space (6) is universally designed for receiving and connecting each of the functional modules (60, 65, 70, 75, 80, 82, 84, 86, 88, 89), wherein at least one position-securing element (40) is
(Continued)

provided for securing the position of reinforcement (96) and substantially predetermines the outer shape of the component (90).

The invention further relates to a component (90) comprising a textile reinforcement (96), a matrix material, and conduits (16) for the passage of electricity and/or fluids. According to the invention, a receiving structure (1) comprising receiving elements (4) is embedded in the matrix material and is connected to the textile reinforcement (96) and/or the conduits (16) via position-securing elements (40), wherein the textile reinforcement (96) is aligned in a load-dependent manner with respect to the receiving elements (4), and the receiving elements (4) of the receiving structure (1) are designed in such a way that an influence on the load-bearing behavior of the produced component (90) is minimized.

The invention also relates to a method of producing a device with the receiving structure (1).

13 Claims, 5 Drawing Sheets

(51) Int. Cl.

| | | |
|---|---|---|
| *E04C 2/06* | (2006.01) | |
| *E04C 5/07* | (2006.01) | |
| *H02G 3/18* | (2006.01) | |
| *H02S 20/22* | (2014.01) | |
| *E04B 5/32* | (2006.01) | |
| *H02G 3/38* | (2006.01) | |

(52) U.S. Cl.
CPC ............. *H02G 3/185* (2013.01); *H02S 20/22* (2014.12); *E04B 5/326* (2013.01); *H02G 3/38* (2013.01)

(56) References Cited

U.S. PATENT DOCUMENTS

| | | | |
|---|---|---|---|
| 9,831,648 B1* | 11/2017 | Gretz ..................... | H02G 3/088 |
| 2010/0029154 A1* | 2/2010 | Tankere ................... | B32B 5/26 |
| | | | 442/42 |
| 2012/0210656 A1* | 8/2012 | Martin Hernandez ... | E04B 5/48 |
| | | | 52/125.1 |
| 2017/0058518 A1* | 3/2017 | Levinton ................ | E04C 5/162 |

FOREIGN PATENT DOCUMENTS

| | | | | |
|---|---|---|---|---|
| DE | 102017111838 A1 | | 12/2018 | |
| DE | 102018122613 A1 | | 3/2019 | |
| EP | 1236843 A2 | * | 9/2002 | ............... E04B 5/21 |
| EP | 2466707 A1 | * | 6/2012 | ............. H02G 3/185 |
| JP | 2002371660 A | | 12/2002 | |
| KR | 101726791 B1 | * | 4/2017 | |
| WO | WO-2018130726 A1 | * | 7/2018 | ............. H02S 20/22 |

* cited by examiner

RECEIVING STRUCTURE, TEXTILE-REINFORCED COMPONENT AND METHOD FOR PRODUCING THE COMPONENT

CROSS REFERENCE TO RELATED APPLICATIONS

This application is the U.S. national stage of International Application No. PCT/EP2020/076255, filed on 2020 Sep. 21. The international application claims the priority of EP 19198960.7 filed on 2019 Sep. 23; all applications are incorporated by reference herein in their entirety.

BACKGROUND

The invention relates to a receiving structure that is provided for casting into a matrix material, in particular concrete, of a component and has at least one receiving element which protrudes from the receiving structure in such a way that it projects at least partially into the matrix material. The invention also relates to a component comprising a textile reinforcement, a matrix material, in particular a mineral matrix material, and conduits, in particular for the passage of electricity or fluid, and to a method of producing the same. In addition to the conduction, the conduit can also assume additional functions in the sense of a functional module, such as serving as a textile reinforcement with integrated sensor technology or as a reinforcement designed as a textile heating element.

A large part of the components comprising structures or buildings primarily serves to protect against the weather. However, the individual use of the structures, for example, for living, working, or exhibiting, can be linked to further tasks beyond pure weather protection, such as enclosing or supplying-disposing needs of the occupants or users. The task of enclosing, which primarily serves to create an artificial microclimate suitable for the respective purposes, can be broken down into many, mostly building-physical requirements, such as wind protection, protection against precipitation, thermal conditioning, control of the vapor balance, sound insulation, natural lighting, or fire, sight, glare and sun protection. In addition, there is the task of supplying and disposing of the building or the occupants with media such as water, thermal energy, or electricity.

If a building is to fulfill these tasks of supporting, enclosing, and supplying, specialty competencies are required for planning and implementation. The construction of new buildings thus involves the interaction of different specialty areas and disciplines. The coordination of these other areas leads to a high expenditure of time and money as well as a high error rate and uncertainty in the planning. A combination of the different technologies is currently not possible in the precast plant according to state-of-the-art.

For the installation of data and power conduits, separate and subsequently installed cables, mostly copper-based, are often used. The dual use of the provided reinforcement does not take place in structural and digitization terms, which is mostly electrically conductive, no matter if steel or textile reinforcement, for example, carbon rovings. Moreover, steel reinforcement is only suitable to a minimal extent as a direct unshielded data conductor in a concrete composite. For this, either an additional carbon yarn structure designed as a current and data conductor would have to be added, or a combined composite structure would have to be created. Like carbon roving, carbon yarn consists of many carbon fibers, the individual filaments.

Conventionally, buildings are made using the in-situ concrete construction method. This means that the components are produced on-site. For this purpose, the concrete is placed in a formwork at its installation site and stripped after hardening. Once the shell is complete, specialist installers for heating, plumbing, and electrical installations or the installation of various renewable energy technologies enter the construction site to add additional functions to the building.

In addition to the in-situ concrete construction method, there is also the so-called precast construction method. In this construction method, precast elements are produced in the factory, transported to the construction site, and assembled into a building at the site. This often leads to a reduction in construction time, independence from weather conditions, and thus better planning reliability, as well as lower costs due to the high degree of industrial prefabrication. Furthermore, in this case, builders have a single contact person who coordinates and often handles the service and maintenance work. High precision and quality are further advantages of precast construction over in-situ concrete construction. According to the current state-of-the-art, however, the precast elements produced in the factory have only a structural or room-dividing function. Here, too, it is only after completion of the shell that the individual specialist installers enter the construction site to install the particular technologies in-situ, i.e., on the construction site.

In addition to this conventional separation, various approaches exist to integrate functional modules into a matrix material, particularly the concrete matrix, already in the precast plant. In so-called sandwich walls, insulating elements are already integrated into the precast plant. This results in a functionalized precast part to provide thermal insulation. In addition, photovoltaic modules can already be incorporated into the precast element production process. The elements obtained in this way are called building-integrated photovoltaics (BIPV), also (GiPV, Gebäudeintegrierte Photovoltaik, from German).

It is also known to integrate so-called phase change materials, also PCM or phase change materials, into components. For this purpose, latent heat storage materials are filled into metallic capsules and mixed into the concrete matrix. Interchangeability and positional stability of the capsules within the matrix are not possible in this way.

Outside these applications, no commercially available components with integrated electrical components or smart materials are known to date. In the narrower sense, intelligent materials (also known as smart materials or responsive materials) are materials that have been specially developed to respond independently in a specific way to changing environmental conditions (e.g., temperature increases, mechanical stress, pH value). In a broader sense, this includes all materials the properties of which can be influenced by active control (e.g., via an electrical voltage) in a way that is impossible with ordinary materials.

Thus, further building tasks are only implemented by installing technologies by separate trades on-site at or in the building. In this way, the advantages of precast production remain unused for the majority of building technologies.

Some of the aforementioned problems are already solved by prior art. For example, DE 10 2005 055 770 A1 describes a component with a reinforcement of a textile spacer, in particular a mesh spacer, e.g. of AR glass fibers, at least partially penetrated by an alkaline curing matrix, in particular, a concrete matrix or other alkaline curing receiving structures. It is provided that the textile spacer has regions in at least one of the two cover surfaces in which no thread spacers are incorporated. In addition, zones free of thread spacers are provided within the mesh spacer in which supply conduits or empty tubes, for such, can be arranged. Such supply conduits can be, for example, electrical cables or pipes for underfloor heating. Concrete is preferably used as the matrix or matrix material.

From the publication DE 10 2018 122 613 A1, a device for data and/or energy transmission via at least one electrical conduit is known, which is arranged in the interior of a component comprising a matrix material. It is proposed that the electrical conductor consists at least of electrically conductive textile yarns, fibers, or rovings, is arranged inside the component, and is firmly cast with the mineral or organic matrix material. It is envisioned that the carbon conductor serves as reinforcement for a component comprising the matrix material. Electrical contacts extending outwardly from the component and accessible outside the component are connected to the carbon conductor.

A similar solution is disclosed in DE 10 2017 111 838 A1 by a fiber composite structure comprising several fiber composite layers, each fiber composite layer comprising fibers and matrix. The fiber composite structure has a first and a second electrically conductive fiber composite layers and an electrically separating fiber composite layer disposed between the first and second electrically conductive fiber composite layers. The first and second electrically conductive fiber composite layers and the electrically separating fiber composite layer include an electrolyte. The fibers of at least one of the first and second electrically conductive fiber composite layers comprise carbon fibers, and/or the fibers of the electrically separating fiber composite layer comprise glass fibers.

Another component from the prior art, a photovoltaic (PV) modular system for generating solar power on buildings, is described in WO 2018/130726 A1. The proposed system comprises at least one component, for example, a precast concrete element made of textile concrete and at least one PV element attached thereto, which can be electrically contacted via at least one electrical conductor track on the component. The PV element is attached to a surface of the component, is embedded in its surface, or is attached to the component in a removable manner. Meanwhile, the conductive track is fully integrated into the component or at least partially applied to a surface of the component, protected against the effects of weather. The electrical contacting of the PV element to the component simultaneously represents an attachment of the PV element to the component. It is also envisioned that a structural reinforcement of the precast concrete element simultaneously serves as an electrical conductor path for contacting with the PV element, wherein the reinforcement is a textile fiber reinforcement, preferably with carbon fibers, additionally provides an electrical conductor path for contacting the PV element. However, the individual photovoltaic cells must each be applied individually and preferably to a textile fiber mat before the casting of the concrete, which has the required conductor paths for interconnecting the photovoltaic elements to form a module. The concrete components are designed in such a way that they can preferably be operated via a single electrical interface (i.e., a plug-in connection as a terminal). On their rear side, the component may have anchors or anchor points designed as assembly fittings. The proposed solution is limited exclusively to use with PV systems.

The publication JP 2002 371660 A is also known from the prior art. The cable feedthrough disclosed there is provided for casting into a matrix material, in particular concrete, of a structural element and has at least one receiving element. However, no position securer is provided for securing the position of the reinforcement relative to the cable feedthrough. Still, the cable feedthrough is, in contrast, secured to the stable reinforcement. Furthermore, no functional elements are disclosed that can fulfill a technical function, or this is exhausted in such a way by the covering of the cable feedthrough.

The integration of different functional modules, such as electronic components or intelligent materials, into precast elements is only possible to a minimal extent, according to the state-of-the-art. There are no solutions that allow a standardized combination of different building functionalities (load-bearing, enveloping, supply) in precast elements. The main reason for this is that the available technologies, such as electrical or thermal energy storage, are not in themselves suitable for integration into components. Components have high requirements in terms of safety, durability, and fire resistance, among other things. If functional modules, especially electronic components or materials, are integrated into components, these would also have to meet the requirements for components. Conventional technologies do not meet these requirements and, for this reason, can only be integrated into components to a limited extent.

Furthermore, the components to be integrated are not sufficiently robust to withstand the weather conditions and the often alkaline environment of the surrounding matrix, e.g., a concrete matrix. In addition, the various components have a shorter service life than the surrounding matrix, especially the concrete matrix, and must be renewed or replaced at different times. Thus, the components must be connected to the matrix in a demountable manner.

To guarantee the load-bearing capacity and safety of the structural element, the position of the integrated components within the matrix, usually the concrete matrix, must be defined. Therefore, during the production process, the positional certainty of the components to be integrated, such as the reinforcement, and the electrical components or the assembly fittings, would have to be guaranteed.

In addition to the previously mentioned "sandwich wall" and "BIPV" components, individual stand-alone solutions exist that provide for a simple "setting in concrete" of the functional modules. These were developed for a specific application and a specific function. Transferability to other areas of application or the integration of different functional modules is therefore only possible to a minimal extent. They are therefore very inflexible and limited in their area of application and their sales number, and the development and implementation of functionalized components thus mean a high level of individual development effort. Furthermore, these individual solutions are not suitable for multiple productions in the precast plant. Furthermore, these individual solutions often do not meet the requirements for safety, load-bearing capacity, and fire resistance, which is why they can only be used in subordinate structural elements that are not relevant in terms of safety. Furthermore, in the individual solutions described, the functional modules are not detachably connected to the concrete. This makes dismantling at the end of their life cycle more difficult and prevents the replacement of the functional modules for repair or modernization.

Last but not least, this reduces the service life of the overall component. Furthermore, the position certainty of the integrated functional modules is often not given, making quality assurance and predicting the functional capability and the structural load-bearing capacity more difficult. Furthermore, the durability of the functional modules is reduced by simply "setting them in concrete," as they are not suitable for a moist, alkaline environment. Furthermore, the integration of functional modules usually impairs the load-bearing effect of the overall component if they have been inserted at structurally relevant points.

In addition, existing solutions are not suitable for large-scale production. Conventional approaches do not offer an economically viable solution for integrating functional modules into precast parts. This means that a separation of the building functions is currently necessary or represents the economically more sensible alternative. The separation of the individual planners or trades leads to additional work in planning, coordinating, and implementing the overall building. If one trade is delayed, many other trades are often affected, leading to significant delays in the construction process and a high degree of planning uncertainty. The installation of building technology on the construction site leads to high susceptibility to errors as well as an extensive coordination effort.

SUMMARY

The invention relates to a receiving structure (1) which is intended for casting into a matrix material and has at least one receiving element (4), which projects out of the receiving structure (1) in such a way that it can project into the matrix material. According to the invention, the receiving element (4) has in its interior a receiving space (6) which has an opening (10) facing the surface (94) of the component (90), through which opening (10) a functional module can be guided for insertion into the receiving space (6), wherein the receiving space (6) is universally designed for receiving and connecting each of the functional modules, wherein at least one position securer (40) is provided for securing the position of reinforcement (96) and substantially predetermines the outer shape of the component (90).

The invention further relates to a component (90) comprising a textile reinforcement (96), a matrix material, and conduits (16) for the passage of electricity and/or fluids. According to the invention, a receiving structure (1) comprising receiving elements (4) is embedded in the matrix material and is connected to the textile reinforcement (96) and/or the conduits (16) via position securers (40), wherein the textile reinforcement (96) is aligned in a load-dependent manner with respect to the receiving elements (4), and the receiving elements (4) of the receiving structure (1) are designed in such a way that an influence on the load-bearing behavior of the produced component (90) is minimized.

The invention also relates to a method of producing a device with the receiving structure (1).

DETAILED DESCRIPTION

It is, therefore, the task of the present invention to solve technical problems that stand in the way of integrating functional components, such as electronic components or intelligent materials, into building components. Furthermore, compatibility with the conventional production methods of precast factories and simple conversion of production is to be achieved. The task continues to be integrating various technologies into the precast production process.

The problem of the invention is solved by a receiving structure which is provided for casting into a matrix material, in particular concrete, of a component, and it has at least one receiving element which protrudes from the receiving structure or projects from its surface in such a way that it can, at least partially, project into the matrix material or projects into it in the installed state. According to the invention, the at least one of the receiving elements has in its interior a receiving space that has an opening towards the surface of the later component. The opening is accessible from the outside, even after installation in the component. At least one functional module can be guided through the opening provided for insertion into the receiving space. The receiving space is universally designed for receiving and connecting each of the functional modules. For this purpose has at least one connection option for a fluid and an electrical connection. Connection options for data and control conduits, e.g., electrical, optical, or direct heat conduction, are also advantageous.

Furthermore, at least one position securer is provided for securing the position of a preferred textile reinforcement. According to an advantageous embodiment, the receiving structure covers 80% of the outer surface of the concrete element. In its function as a stay-in-place formwork, which it can also assume according to an advantageous embodiment, the receiving structure decisively predetermines the outer shape of the component. The receiving structure, according to the invention, enables the reinforcement to be positioned, wherein the at least one position securer provided for this purpose serves to deposit and position a yarn, in particular made of glass or carbon, so that, alternatively, it enables the free layout of the reinforcement without a fixed, predetermined grid.

According to an advantageous further development, the receiving structure comprises at least one web with which the receiving elements are connected in an articulated manner. This ensures that the receiving structure can also be curved several times. Still, at the same time, the receiving elements assume an essentially tangential position to the curved surface and do not undergo any deformation themselves. The receiving elements thus remain undeformed and aligned normally or tangentially to the curved surface. This makes it possible to use the receiving structure, according to the invention, also for the production of double curvature components or with double curvature surfaces.

The at least one receiving element is arranged structurally optimized in a subordinate structural region of the component comprising the matrix material in such a way that matrix material is displaced, but at the same time, the load-bearing capacity of the component comprising the matrix material is still guaranteed.

The receiving elements are thus designed in such a way that they have as little influence as possible on the load-bearing behavior of the component produced; they are preferably introduced in regions that are not relevant from the point of view of structural mechanics. The receiving elements of the receiving structure thus lead to structural optimization, which means less concrete is used with virtually the same load-bearing effect. The receiving elements replace concrete that is not required for structural mechanics. The receiving elements are arranged so that sufficient load-bearing capacity of the component can be ensured. In addition, it can be mass-produced in modular form and optimized for specific load conditions, such as bending due to wind load. The receiving structure can also serve this aforementioned structural and material-saving function exclusively without having to use functional modules.

The receiving elements correspond to the outer shape of the functional modules in an inner receiving space. They can therefore be used to integrate the functional modules. The mounting structure advantageously has a device for making a detachable mechanical connection between the mounting structure and the functional modules, as well as different devices for contacting the functional modules with a conduit or a conduit network.

Recyclable materials such as tinplate or plastics, e.g., ABS, can be used to produce the receiving structure. Preferably, the materials used are alkali-resistant, weather-resistant, and suitable for production by injection molding, thermoforming or deep drawing. Thermoforming or deep drawing are cost-effective ways of mass-producing this three-dimensional shape. This process also makes it possible to produce single- or double-curved receiving structures. This, in turn, enables the production of curved components. Furthermore, the material is preferably flame retardant and has suitable dripping and smoke development behavior for use as a component.

According to an advantageous embodiment or use, the receiving structure further serves as a formwork element. A formwork element is a mold into which the liquid matrix or matrix material, in particular the concrete matrix, is introduced and which determines the outer shape of the component. As a rule, the mold is removed after the concrete has hardened. However, the receiving structure remains in the component after the matrix, particularly the concrete matrix, has hardened. Together with the matrix, it forms the component and determines its basic outer shape. The receiving structure can be used as a stay-in-place formwork.

Textile reinforcement is used to increase the load-bearing capacity. This increases the resistance of the component to tensile stresses. At least one layer of textile reinforcement, such as carbon, glass, hemp, or basalt, is used within the component. Often, two layers of textile reinforcement are used. They run in the spaces between the functional modules and/or under the receiving structure. The number and position of the individual reinforcement layers depend on the application area and the load on the component.

It has proved advantageous that the component has a textile reinforcement the yarns of which, for example, designed as scrim, form a rectangular grid which is preferably held together by a connecting thread or glued joints. The distance between the centers of the receiving elements is a multiple of the mesh size of the grid, and the outer diameter of the receiving elements is smaller than the mesh size of the grid. Both conditions simplify the connection of the textile reinforcement to the receiving structure. In particular, the scrim or mesh is aligned in a load-dependent manner with respect to the receiving elements.

Insofar as only the preferred carbon yarn is mentioned below, the use of carbon fibers or carbon rovings is nevertheless also envisioned. Carbon fibers, carbon yarn, or carbon rovings are also used, for example, in finished parts or components with an organic matrix, such as fiber-reinforced synthetic resin. In addition to carbon, other materials are also provided for textile reinforcement, such as AR glass or basalt.

The invention further relates to a component made of textile concrete with integrated functional modules and to an associated method for producing this functionalized component with the aid of a prefabricated receiving structure. The receiving structure serves as a semi-finished part, which is used for securing the position of a textile reinforcement, of assembly parts as well as of electronic components and smart materials and is embedded in a load-bearing matrix, for example, of concrete.

Advantageously, a detachable mechanical connection is provided between the receiving structure and the at least one functional module, as well as contacting of the at least one functional module with at least one conduit. The connection of the functional modules to the receiving structure can be made by a click, plug-in, or screw connection. The functional modules are connected to the receiving structure to form a semi-finished part, which can then be inserted into the matrix, particularly the concrete matrix.

Preferably, the at least one conduit is a universal conduit, an empty conduit for receiving other conduits, and/or a reinforcement. However, it may also be an electrical conduit or a fluid conduit. The at least one conduit is preferably connected to the receiving structure. Conduits are also provided, which serve as reinforcement. This applies in particular to electrically conductive carbon yarns.

In addition, the receiving structure itself can also have ducts for integrating conduits. The channels are already introduced during the production of the receiving structure, preferably in a deep-drawing process or thermoforming process. The ducts can be all-purpose, such as empty tubes or capillary tubes. Conduits are also foreseen, which also serve as reinforcement. This applies in particular to electrically conductive carbon yarns.

The cables in the ducts, which may already have been installed before concreting, are used to transmit energy or information. They are used to contact the functional modules with each other. They are installed in such a way that they impair the load-bearing capacity of the component as little as possible. The connection between the cable and the functional module is designed in such a way that the functional modules can be easily assembled and disassembled.

Advantageously, at least one assembly fitting and/or at least one position securer are provided. At least one assembly fitting connected to the receiving structure is embedded in the matrix material and enables transport as well as mounting of the component to a superordinate structure. This enables an additional mounting connection for fastening, for example, to a receiving structure as an outer shell of a hang-in facade, a wall cladding, or a ceiling cladding. This has, for example, at least one external functional component, in particular a photovoltaic element.

The mechanical connection of the component to the substructure or other components can also be realized by adhesive joints, riveted joints or through-bolted joints. However, the use of assembly fittings such as threaded sleeves, flat anchors, or anchor channels proved particularly advantageous. These are connected to the receiving structure before concreting. The receiving structure thus secures the position of the assembly fittings. After casting and hardening, there is a firm mechanical connection between the assembly fittings and the concrete matrix. A fastening system can then be attached to these assembly fittings. The assembly fittings enable a connection with other concrete elements or a load-bearing substructure.

The at least one position securer connected to the receiving structure enables the position of the textile reinforcement and/or the at least one cable to be secured. The mounting of a functional component with the mounting structure can be produced by a click, plug-in, or screw connection. The functional modules are connected to the receiving structure to form a semi-finished part, which can then be inserted into the matrix, particularly the concrete matrix. It is also possible to accommodate the functional modules in capsules, which then have increased durability and fire resistance or are even required for specific applications.

The reinforcement is directly connected to the receiving structure using the position securers. The reinforcement can, therefore, also follow the course of the receiving structure in parallel. The use of a formable textile reinforcement is particularly suitable. In this way, the entire semi-finished part, comprising the receiving structure, reinforcement, assembly fittings, and functional body, remains freely formable. This enables the production of curved reinforced concrete elements. This is a significant advantage over other reinforcement materials, such as steel, which can only be formed into curved shapes with increased effort.

The receiving structure can also be designed in such a way that it can easily adapt to a curved surface. This is achieved by placing webs with a point-shaped articulated connection between the receiving elements. This point-shaped connection allows free rotation of the receiving element. Each receiving element has at least one, but preferably four, connection points.

The use of scrims is particularly suitable as reinforcement. These already have a rectangular grid of weft and warp threads, for example, rovings, which are held together by knitting threads. This textile scrim is connected to the receiving structure by the position securers.

In addition, individual yarns or rovings (e.g., made of carbon, glass, basalt, or natural fibers) can also be used. Instead of a textile reinforcement with a predefined rectangular grid, the individual yarns or rovings can be freely and individually laid down in the position securers and connected to the position securers. The rovings or the reinforcement can thus follow a course that is determined only by the locations of the position securers. The rovings can thus be deposited precisely at the points where they are required from a structural-mechanical point of view and form a force-flow-compatible reinforcement layout. In this way, the receiving structure makes it easy to produce components with a force-flow-oriented reinforcement layout.

The textile reinforcement is also kept at a defined distance from the receiving structure by the position securers. If the receiving structure is deformed to produce free-formed components, the course of the yarn or rovings follows the receiving structure. This positional certainty of the textile reinforcement is necessary to guarantee the load-bearing behavior of the component. The load-bearing capacity depends to a large extent on the position of the textile within the matrix, in particular the concrete matrix.

The textile reinforcement can also be used to transport data and/or energy. For this purpose, either the material (e.g., carbon) is used directly, or an additional conductive element (e.g., copper wire) is introduced into the textile. The textile can thus be used to connect the individual functional modules to each other. For contacting, the functional modules are connected to the conductive reinforcement via the position securers. For this purpose, the position securers must be conductive or preferably have an opening for cables or means for contacting.

For the mechanical and electrical connection of the textile reinforcement to the receiving structure, plug-in, click, or screw connections are also used. The primary purpose of these connections is to ensure the positional certainty of the textile reinforcement. This positional certainty of the textile reinforcement is necessary to guarantee the load-bearing behavior of the component. The load-bearing capacity depends to a large extent on the position of the textile within the matrix, in particular the concrete matrix.

Instead of a textile reinforcement with a predefined rectangular grid, the roving (carbon, glass, basalt, natural fiber) can also be placed freely in the position securers. In this way, the reinforcement can be attached to the receiving structure and thus to the subsequent concrete element following the force flow. This enables the serial production of structurally optimized concrete products.

The yarn can also be used to conduct information or energy. For this purpose, a suitable material, such as electrically conductive carbon, is used to produce the textile, or additional conductive strips or cables are incorporated into the textile reinforcement. If the textile reinforcement is used for data or energy exchange, the position securers contact the yarn or roving with the external functional modules. For this purpose, for example, the position securers can be designed to be conductive. They are connected to the yarn, the roving, or a cable integrated therein (e.g., a copper cable) and conduct information or energy into or out of the functional modules into the yarn or the roving. Contact points are provided on the functional modules to provide a removable and straightforward connection to these position securers. The conduction via the yarn represents an alternative to the conduction network of the pick-up structure.

The position securers and contact modules allow easy integration of other elements into the component. The present invention mainly integrates capillary tubes and/or heatable textiles. The heatable textiles are laid flat and like reinforcement before concreting and are also contacted with a control unit. For this purpose, they are connected to a contact module via the position securers. Current can be applied to the heatable textile, causing the textile and its surrounding matrix, particularly the concrete matrix, to heat up. The component can be used for heating in this way. The heating power is controlled by a function module provided for this purpose.

The capillary tubes are also connected to the receiving structure by position securers. The capillary tubes can be held in a defined position by the position securers. The capillary tubes are connected to the function modules, which use valves and/or pumps to control the fluid flow and thus the heating or cooling capacity.

Accordingly, the present invention also aims to integrate functional modules such as electronic components or intelligent materials, which react independently to changing environmental conditions (e.g., temperature changes, mechanical loads, humidity), into precast elements in such a way that they meet the requirements of building law. The precast concrete element, in combination with the integrated functional modules, forms a functionalized component. In addition to the conventional tasks of a precast concrete element, such as the dissipation of forces, weather protection, or aesthetics, this element can perform various additional tasks.

To meet the requirements for components and to protect the components to be integrated, capsules are used which enclose the components to be integrated. These functionalized capsules are referred to below as functional modules. A uniform geometry and standardized connection and contact points of the functional modules allow easy connection to the receiving structure and the production of high volumes.

The external shape of the functional module corresponds to the shape of the recesses of the mounting elements, which in turn, like the position, can in principle be freely selected. To enable serial production, however, the aim should be to achieve identical geometries and a fixed grid, at least within one production run or series. Cylindrical, cubic, or hexagonal geometries proved to be advantageous. Furthermore, the edges of the functional modules should be chamfered. This reduces the notch effect and contributes to higher strength of the overall body.

The casing or encapsulation of the functional modules protects the internal electrical components and materials from moisture. The encapsulation can be made of plastic, for example. The functional body has contact points for transporting information and energy. Via these contact points, the functional body can subsequently be connected to the wiring network of the receiving structure and/or further functional modules.

The integration of renewable energy technologies in precast components has proved to be particularly advantageous. The integrated functional modules are used for thermal or electrical energy generation, thermal or electrical energy storage, and energy management. With the help of the invention, the various renewable energy technologies can be combined to form an individual overall system that meets the building owner's requirements.

Different technologies and materials can be incorporated into the functional modules. This means that the functional modules can perform a wide range of functions. Depending on the design of the functional modules, the component or the finished part can perform different tasks. Some functional modules are presented as examples.

According to an advantageous embodiment of the receiving structure or the functional component, in particular, the at least one functional component is designed as a storage device for thermal or electrical energy. For electrical energy storage, current storage devices are integrated into the component. Electrical energy storage can be used to compensate for differences between supply and demand in the power supply.

According to a further embodiment, the receiving structure or, in particular, the at least one functional module is designed for thermal or electrical energy generation. For thermal energy buffering, the functional modules are filled with so-called phase change material (PCM). These PCM functional modules store a large part of the thermal energy supplied to them in the form of latent heat.

According to an alternative embodiment of the receiving structure or of the functional module, in particular, the at least one functional module comprises at least one sensor for detecting temperature, humidity, or other physical variables and/or for bidirectional transmission of information between internal component receivers to the external components.

According to a further alternative embodiment of the receiving structure or of the functional component, in particular, the at least one functional component comprises a control device which is designed to process the data detected by the at least one sensor and/or the information received or to be sent and/or to control or regulate the function of further functional modules and thus to control or regulate the functionality of the entire component, wherein, when capillary tubes are used, flow regulators or devices for energy management are provided.

According to a further alternative embodiment of the receiving structure or the functional module, in particular, the at least one functional module comprises devices for signaling. This transmits information between the internal component receiver to the external component receiver or vice versa.

According to a further alternative embodiment of the receiving structure or of the functional component, in particular, the at least one functional component comprises a control device which is designed to process the data detected by the at least one sensor, and/or the information received, or the information to be sent, and/or to control or regulate the function of further functional modules, and thus to control or regulate the functionality of the entire component, wherein, for example, voltage and current controllers are provided when electrical storage devices are used; flow controllers or devices for energy management are provided when capillary tubes are used.

According to a further alternative embodiment of the receiving structure or of the functional module, in particular, the at least one functional module is designed as a connection module, comprising an external output, and is designed or contains components, in particular liquids, in such a way that, information or energy internal to the component can also be bundled and routed to the outside via an external output, for example consisting of conduits and tubes. Via this interface, for example, electrical energy from the storage units or the PV module and fluids from the capillary tube system is fed into or out of the component. This function is used in the component as a general or on a case-by-case basis, also in redundancy.

According to a further alternative embodiment of the receiving structure or of the functional module, in particular, the at least one functional module is designed as a contact module. It enables simple contacting of different additional devices, depending on the application, such as heatable textiles or capillary tubes, which enable, for example, thermal energy recovery. The contact modules have a contact point on the underside via the position securers for connection to the heatable textile or the capillary tubes. They can be connected to the conduit network of the receiving structure on the other side. The contact modules enable simple contacting of these other technologies. This makes it possible to control the functional module.

In addition to heatable textiles and capillary tubes, external functional modules, such as a solar or photovoltaic module, can also be attached to the component. This converts light into electrical energy. For mechanical fastening the photovoltaic module to the component, position securers are inserted in the receiving structure before concreting. The component is then cast. After the concrete has hardened, the photovoltaic module is connected to the component. Contact is made through a connection opening. This connection opening is created by a tube attached to the receiving structure. Through this opening, a connection can be made between the photovoltaic module and a functional component, the contact component being particularly suitable.

Contact modules are also required for transporting media, including information, liquid, or energy, out of or into the component. The position of their contacting point is defined relative to the mechanical connections. This relative distance is preferably standardized. This achieves interchangeability and modularity.

Another aspect of the present invention relates to a component comprising a textile reinforcement, a matrix material, in particular a mineral matrix, and conduits, in particular for the passage of electricity and/or fluids. According to the invention, it is provided that a receiving structure comprising receiving elements according to the above description, in particular, corresponding to claims 1 to 9, is embedded in the matrix or the matrix material and is connected to the textile reinforcement and/or the conduits via position securers. The textile reinforcement is aligned according to the load to the receiving elements, and the receiving elements of the receiving structure are designed so that an influence on the load-bearing behavior of the generated component is minimized. The receiving elements are preferably inserted in regions of subordinate structural-mechanical relevance.

The integration of different technologies in the process of precast element production is particularly advantageous. This is achieved by integrating functional modules into the component, thereby enabling the component to perform tasks such as supporting, enclosing, supplying, and disposing. Accordingly, the present invention is mainly aimed at producing components in prefabricated construction. Prefabricated components are components prefabricated from raw materials or semi-finished products, which can be used without further processing in a final product, in this case, in particular, a building.

The production process of the component, which is also an object of the present invention, first provides for the production of the receiving structure by a deep-drawing process or another known process. Subsequently, the textile reinforcement and, if necessary, assembly parts and functional modules are attached to the receiving structure. Plug-in, screw, or click connections are used for fastening and contacting and are connected to the receiving structure. If plastic parts are used, the cold-melting process has proven to be particularly advantageous for connecting the elements to the receiving structure.

In addition, functional modules and assembly parts such as anchoring elements can be connected and contacted with the receiving structure. The semi-finished product produced in this way is then cast into a matrix, particularly concrete.

The receiving structure essentially influences the production process. This enables easy integration of functional modules into the conventional production process of precast parts. In particular, the position of assembly parts, functional modules, and textile reinforcement can be secured with the help of the receiving structure. The semi-finished part produced in this way is then inserted into a formwork element, which is then filled with a matrix material. The underside of the receiving structure preferably faces the underside of the formwork. The connection between the formwork element and the receiving structure can be made by a magnetic connection, an adhesive, or a clamp connection. The semi-finished part makes it possible to produce functionalized components in series. An exemplary production process is composed of the steps:

i) Production of the receiving structure using deep-drawing or thermoforming processes with conduit channels, holes, and receiving elements for integration of the functional modules;

ii) Combination of the receiving structure with cables, functional modules, assembly fittings (threaded sleeves, etc.), position securers, textile reinforcement, functional module and/or further functionalities (capillary tube system, textile heating);

iii) Installation of the receiving structure in a formwork element;

iv) Concreting and storage of the component for curing;

v) Stripping of the element, holding structure with functional bodies remains in the component and vi) Attaching and contacting external functional modules (for example, photovoltaic module) with the component.

The semi-finished product, consisting of the receiving structure, assembly fittings, textile reinforcement, and functional modules, forms the core of the receiving structure according to the invention. An essential feature is the combination of textile reinforcement, assembly fittings, and functional modules in a single semi-finished product, which is only joined to the matrix, particularly the concrete matrix, after assembly. The receiving structure ensures that the components are secured in position. The components are inserted into the matrix material, particularly into the concrete matrix, in a controlled manner at structurally non-relevant points.

In contrast to existing solutions, the functional modules are not firmly embedded in concrete during production. Still, they are connected to the matrix, particularly the concrete matrix, in a demountable manner via the receiving structure. Furthermore, it is advantageous that the component, according to the invention, can be used as a semi-finished part like a stay in place formwork and remains in the matrix, in particular the concrete matrix. The semi-finished part can be shaped into any free form. Despite deformation, the receiving structure guarantees the positional stability of the textile reinforcement. This enables the production of single- or double-curved reinforced concrete elements.

The invention enables a permanent and secure position integration of different functional modules such as electronic components or smart materials into a matrix, particularly the concrete matrix. This is made possible by encapsulating the technologies in functional modules and contacting them through the receiving structure. The individual functional modules can be combined to form systems. The result is a structurally load-bearing precast element with integrated functions that can be used as a component. This enables the production of novel components such as structurally supporting electrical energy storage systems.

An additional advantage is the optimization of the structural mechanics of the component, which is made possible by the use of the receiving structure and for which it can also be used exclusively. The mounting elements of the mounting structure are located in areas subject to low structural loads. At these points, therefore, the material is displaced and thus saved compared with a solid slab, while the load-bearing capacity of the slab is only slightly affected. A significant advantage is that this structural optimization is now standardized and made possible in serial production. The load-bearing capacity in relation to the material used, in particular concrete, can thus be improved in a simple manner.

Another significant advantage is the flexibility of the receiving structure or the semi-finished product. This allows increased architectural design freedom. The entire component can assume a shape that optimally conducts the forces. This can lead to a reduction in the material used. Furthermore, the reinforcement follows the receiving structure. This allows the reinforcement to be integrated according to the force flow. The reinforcement can thus be placed in a position in the component where it is required from a structural-mechanical point of view.

A significant advantage of using the receiving structure is that it secures the position of the reinforcement and the assembly fittings in the component. By securing the position, the load-bearing capacity of the component can be guaranteed. The position of the functional modules is also defined. This is important to ensure the quality of the component.

Another significant advantage is the fact that a single receiving structure enables the integration of different functional modules. Components can thus be functionalized individually and according to the application scenario. Different functional modules can be combined to form overall systems. Furthermore, they can be individually dimensioned. For example, the current capacity can be adapted by installing more storage components.

Another advantage is the simple contact and exchangeability of the function modules. This allows defective elements to be replaced or the functionality to be adapted even after the component or building has been produced.

Another advantage is that a lot of space is available for function integration. Materials with supposedly poorer characteristic values (e.g., power or energy densities) can thus also be used to fulfill the functionality. This means that ecologically and economically, better materials and products can be used.

Another significant advantage is the possibility to mass-produce the semi-finished part. At the same time, the modularity and interchangeability of the functional modules make it possible to customize the functionalities. The formability allows individual shaping. This enables customized mass production.

The advantage of the invention is that a lot of space is made available for function integration without seriously affecting the load-bearing capacity of the component. A lot of space is thus available to fulfill the respective functionality (e.g., electrical energy storage). It is, therefore, also possible to use materials that have supposedly poorer characteristic values (e.g., power or energy densities). This enables the use of robust, recyclable, and locally available materials, which leads to a more ecologically and economically sensible solution at the system level.

The main advantage of the present invention is the integration of various functional modules into prefabricated parts in such a way that the component resulting from the combination meets all the requirements placed on components (e.g., durability, fire resistance, safety) and, in addition, enables the production of large quantities in the prefabricated parts plant and simple assembly and disassembly of individual functional modules. The invention also has the task of interlinking integrated electronic components and enabling the integration of different types of functional modules in a single precast part. Furthermore, it is advantageous that a textile reinforcement as well as assembly parts, such as anchoring elements, can be permanently connected to the matrix, in particular the concrete matrix, of the precast element.

Another advantage of the invention is the simple integration of different technologies in the production process of precast concrete parts. This is made possible by the receiving structure according to the invention, which is produced as a semi-finished product and serves as a carrier for the functional modules, assembly parts, and textile reinforcement. The receiving structure allows a high degree of prefabrication and can be inserted into conventional production processes, which reduces the time and cost required for assembly. Furthermore, it can also be used as formwork and thus determine the shape of the component. As a core task, it ensures the position of the individual components within the finished part. A defined position of the individual components, in particular reinforcement, functional modules, and assembly parts, in structurally non-relevant areas is essential to guarantee the load-bearing capacity of the component.

The present invention provides the advantages of a functionalized component. The component functionalized by using the receiving structure has the advantage of satisfying the structural safety requirements essentially. In addition, there are the envisioned advantageous functions of supporting (or conducting forces), enclosing (e.g., visual, weather, sound, fire protection), and supplying and disposing of (e.g., heat, water, electricity). The fulfillment of the advantageous functions of supplying and disposing of is made possible by the integrated functional modules. The fulfillment of the advantages of supporting and enclosing is fulfilled by textile-reinforced concrete.

In principle, the object of the invention allows many different functionalities to be integrated into the component and transferred to serial production in precast plants. Some of the advantages or functionalities of the functionalized components produced in this way are listed below for example:

The present invention offers advantages in an electrical energy storage system. One possibility of functionalization is the integration of electrical storage elements. The development of storage systems is currently a significant challenge in converting renewable energies. They serve to balance between fluctuating energy supply and changing energy demand. Electricity storage systems can balance load peaks and supply peaks, make the energy supply more flexible, and guarantee the security of supply in decentralized grids. Economic advantages are provided by energy storage systems in residential buildings, for example, by storing low-cost night-time electricity. The functionalized component has the advantage of energy storage.

The present invention provides the advantages of electrical energy harvesting. The functional bodies allow easy integration of photovoltaic modules. The advantage of the device functionalized in this way is the conversion of light energy into electrical energy.

The present invention provides the advantages of thermal energy storage. In this case, the component, according to the invention, has the advantages of storing heat and cold or limiting temperature peaks. In this way, temperature control (room cooling, heating) of the building can be achieved. This is achieved by integrating latent heat storage (so-called PCM material) into the functional modules. Furthermore, this can be achieved by device activation through integrated capillary tubes. The present invention also provides the benefits of thermal energy harvesting by converting solar energy into usable thermal energy. This is also made possible, for example, by capillary tubes.

The present invention offers the advantages of high architectural flexibility. One possible application scenario of functionalized panels is facades. In addition to the technical advantage, these also have an aesthetic advantage. To fulfill these, the outer form of the component should be as flexible as possible.

The present invention offers advantages in saving resources. A significant advantage of the invention is the optimization of components. The aim is to obtain sufficient load-bearing capacity while using as little material as possible. This is achieved by an optimized shape and position of the functional modules, an optimized outer shape of the concrete element, and an optimized reinforcement design. This is also helped by the fact that the components are connected to the matrix so that they can be dismantled and thus repaired and generally replaced.

The compatibility of the components according to the invention or of the processes for their production with the conventional production methods of precast plants also contributes to the increase in efficiency in the production of components or structures.

BRIEF DESCRIPTION OF THE DRAWINGS

Based on the description of embodiments and their illustration in the accompanying drawings, the invention is explained in more detail below. Showing.

DETAILED DESCRIPTION OF THE PREFERRED EMBODIMENTS

Figure 1:
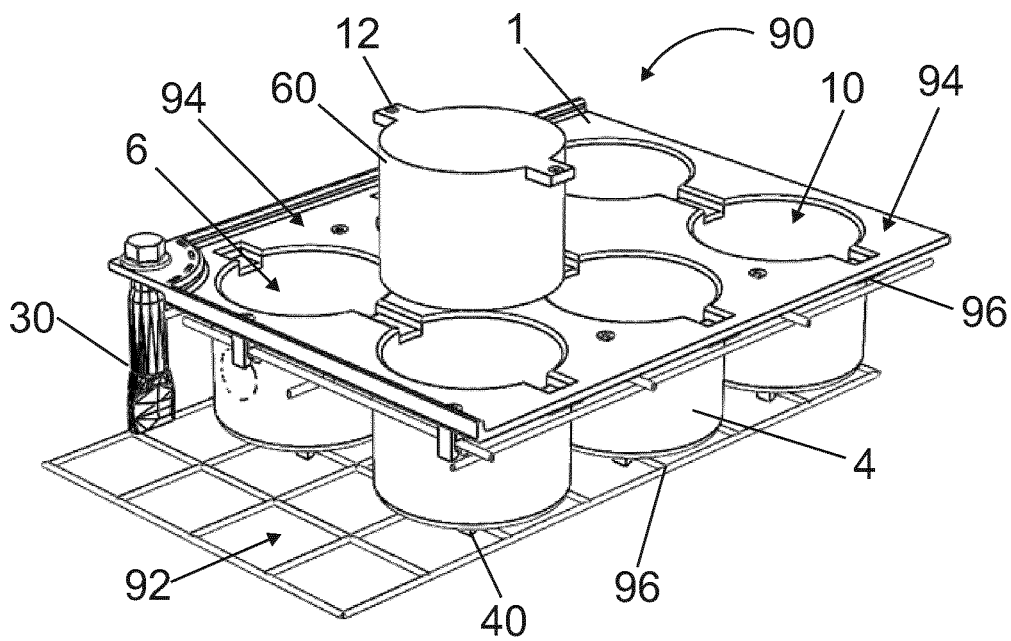
FIG. 1: A schematic representation of an embodiment of a component according to the invention before casting with concrete in perspective view from above.
Figure 2:
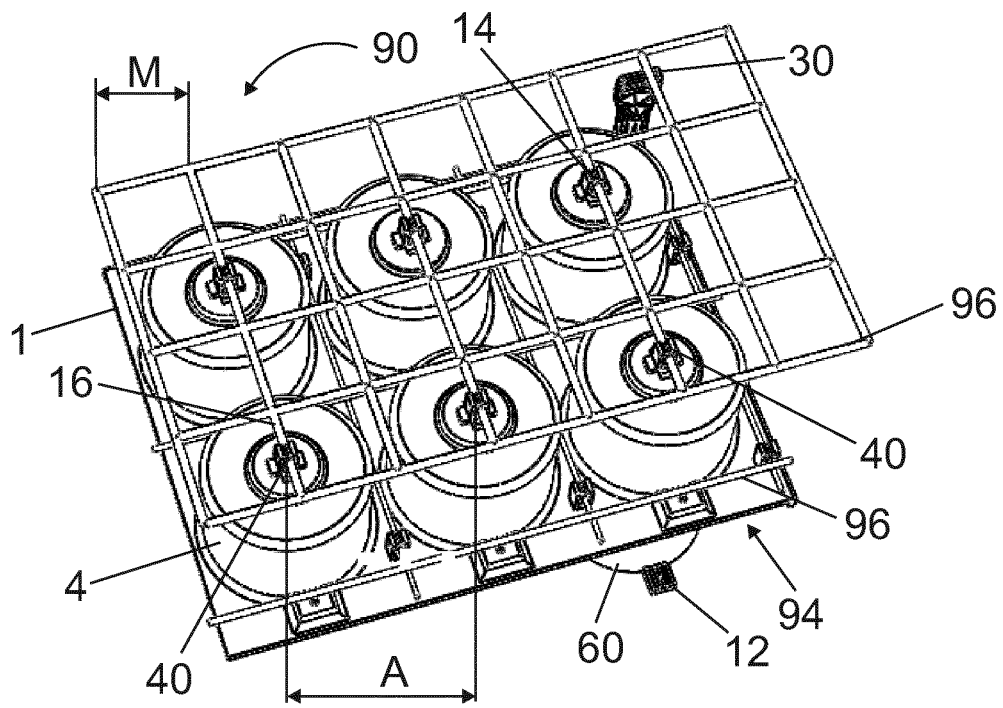
FIG. 2: A schematic representation of an embodiment of a component according to the invention before casting with concrete in perspective view from below.

FIG. 1 shows a schematic representation of an embodiment of component 90 according to the invention before casting with concrete in perspective view from above; FIG. 2 shows this from below. For concrete, the region is indicated in which the matrix is formed after concreting. In the interest of better visibility of the elements inserted into component 90, concrete is not shown. This applies equally to FIGS. 3 and 4.

The receiving elements 4 project downward (FIG. 1) or upward (FIG. 2) from the receiving structure 1, in each case away from the upper side 94. The reinforcement 96 is arranged both below the upper side 94 of the receiving structure 1 and below the receiving elements 4. The reinforcement 96 is secured in its position in each case by position securers 40. The mesh size of the reinforcement 96 is matched to the spacing A of the receiving elements 4. This means that all areas in which the concrete is formed to its full height and is not displaced by the receiving elements 4 can be reinforced. In addition, this allows optimum positional certainty of the reinforcement 96.

The receiving elements 4 each have an opening 10 in the area of the upper side 94, through which the associated functional module 60 can be inserted into the respective receiving space 6. For this purpose, the opening 10 remains accessible from the upper side 94, even in the finished concrete component 90. The functional module 60 is secured in its position in the receiving space 6 by a module lock 12. The functional module 60 is used for electrical energy storage, wherein the electrical energy is supplied via a conduit 16, which also serves as reinforcement 96. The electrical connection between the conduit 16, the receiving element 4, and the function module 60 is provided by a contact 14.

An assembly fitting 30, here designed as a threaded sleeve, is also connected to the receiving structure 1. This is firmly anchored in the concrete after concreting and therefore offers the possibility of connecting the component 90 to a superordinate structure, for example, when using the component 90 as a facade, ceiling, or wall element, with the respective supporting structure, for example, a steel or concrete framework.

Figure 3:
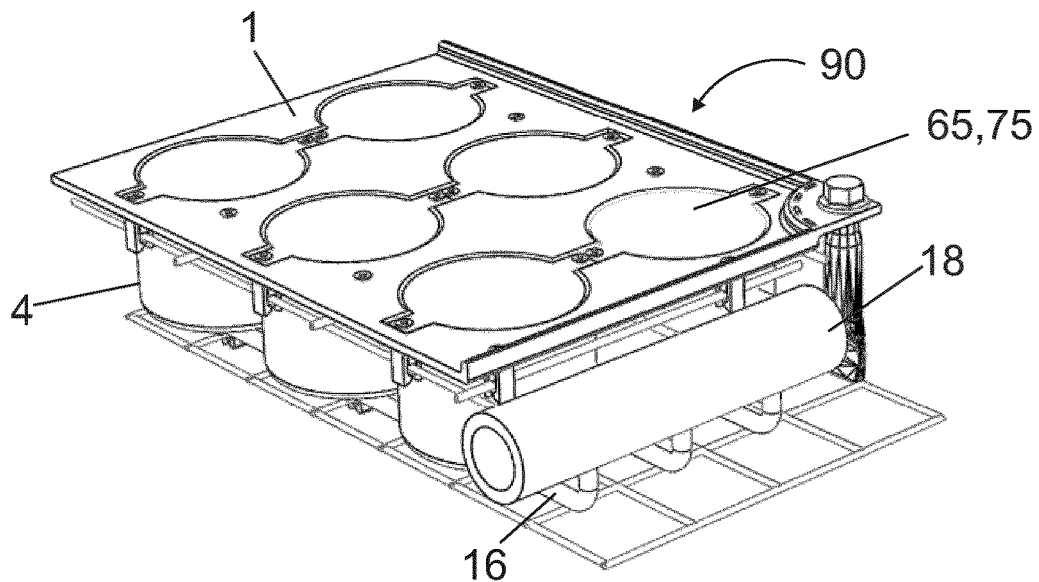
FIG. 3: A schematic representation of a further embodiment of a component according to the invention with embedded conduits before casting with concrete in perspective view from above.
Figure 4:
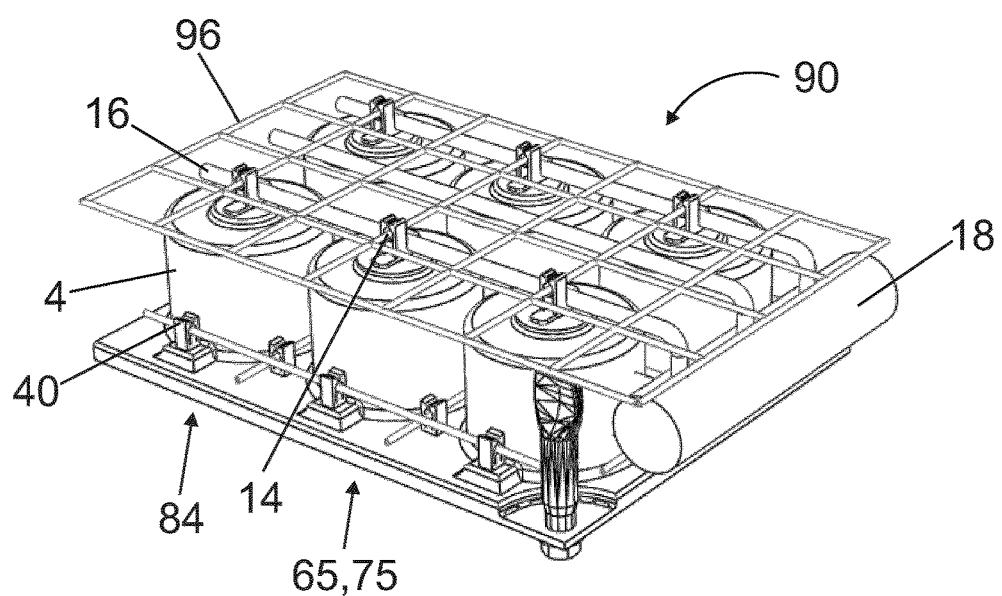
FIG. 4: A schematic representation of a further embodiment of a component according to the invention with embedded conduits before casting with concrete in perspective view from below.

FIG. 3 shows a schematic representation of a further embodiment of component 90 according to the invention with embedded conduits 16 before casting with concrete in perspective view from above, FIG. 4 from below. In contrast to the embodiment example shown in FIGS. 1 and 2, here functional modules 65, 75, which serve to store and generate thermal energy, are inserted into the receiving structure 1, which is otherwise incorporated in the same manner in component 90. One possible use is, for example, as a hang-in facade, whereby in the case of solar radiation, the thermal energy thereby fed is first absorbed by the functional module 75, which is either combined with the functional module 65 or transmits the absorbed thermal energy to an adjacent functional module 65.

If thermal energy obtained in this way is required for use, for example, for heating water or seasonal energy storage, it is delivered by the function module 65 to the conduit 16 via contact 14. In this case, conduit 16 is designed to pass a fluid that serves as a heat transfer medium. The heated thermal fluid is discharged from component 90 via a collector tube 18. The thermal collectors can continuously release heat to their surroundings and thus also to the capillary tubes. The thermal energy absorbed by the fluid or thermal elements keeps the building cool when heat is applied. Furthermore, an optional photovoltaic module is cooled, whereby its efficiency is increased. The thermal collectors give off heat continuously, as long as the outside temperature has fallen below that of the thermal collectors, whereby the component and the building cool down more slowly.

Furthermore, a component 90 or a higher-level receiving structure can be connected to a capillary tube system via functional modules 65, 75. A liquid flows through this capillary tube system. As a heat transfer medium, this transports heat into or out of component 90. Thus, thermal energy can be selectively conducted out of or into component 90. The collector tube 18 of the capillary system terminates in a functional module 84, which controls the flow. The functional module 84 includes a flow controller and/or a pump.

Figure 5:
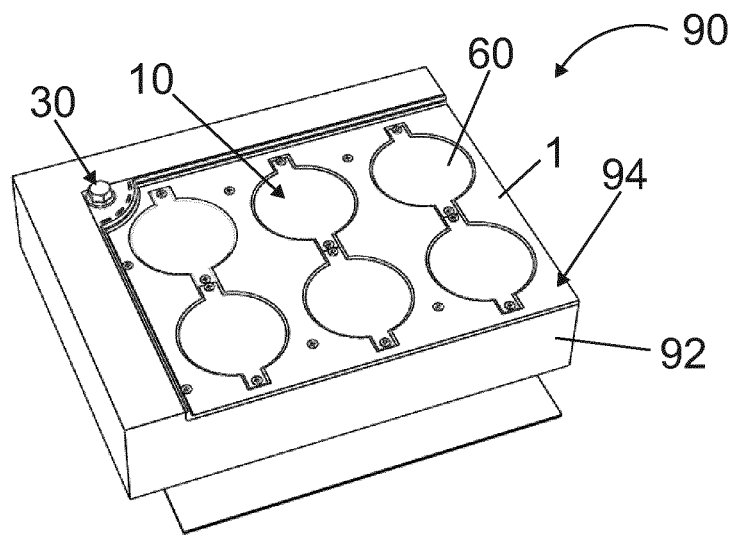
FIG. 5: A schematic perspective view of a further embodiment of a component cast with concrete according to the invention.

FIG. 5 shows a schematic perspective view of an embodiment of component 90, according to the invention, comprising the functional modules 60, here already cast with concrete. On the upper side 94, the openings 10 in the receiving structure 1, which are closed here, can be seen, wherein the closure is effected either by the functional modules 60 or by an additional encapsulation. Also visible is a screw belonging to the assembly fitting 30, with the aid of which the connection of component 90 can be made using transport anchors or connection systems (for example, hang-in systems) for connecting component 90 to the superordinate structure.

Figure 6:
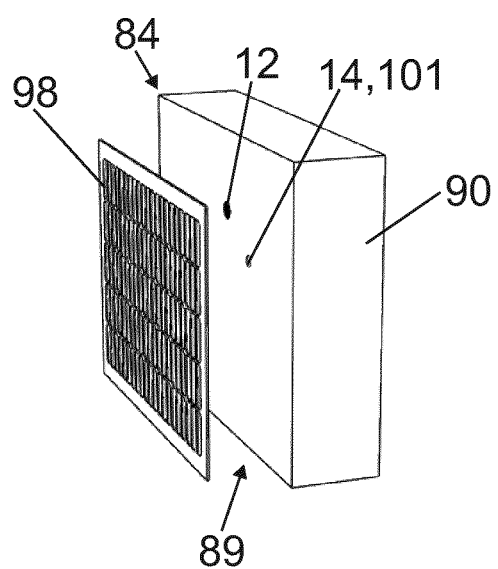
FIG. 6: A schematic perspective exploded view of a further embodiment of a device according to the invention with a photovoltaic module attached.

FIG. 6 shows a schematic perspective exploded view of a further embodiment of component 90 according to the invention with attached photovoltaic module 98. Here, electrical energy generation does not occur in a functional component itself, but a photovoltaic module 98 is placed in front of component 90. The photovoltaic module 98 is connected to a functional module 98, designed as a contact module, via a fixing connection 120 (for example, designed as a threaded sleeve or a flat armature) and an electrical contact 14, designed as a feedthrough 101 for contacting external elements. As a result, the electrical energy generated in the photovoltaic module 98 can be delivered within component 90 while dispensing with additional, superficial wiring, which is, therefore, more susceptible to interference. At the same time, it is easier to replace the photovoltaic module in the event of a defect. Furthermore, a functional module 84 with a control device is provided, which monitors the electrical energy generation of the photovoltaic module 98, which may also comprise an inverter and issue a corresponding alarm message in the event of a power drop or defect.

The module lock 12 and the feedthrough 101 are connected to the receiving structure 1 before concreting, allowing the photovoltaic module 98 to be placed with a precise fit. If a capillary system and/or at least one functional module 65 to store thermal energy are provided, the photovoltaic module 98 is cooled. This increases the efficiency of electrical energy generation.

Figure 7:
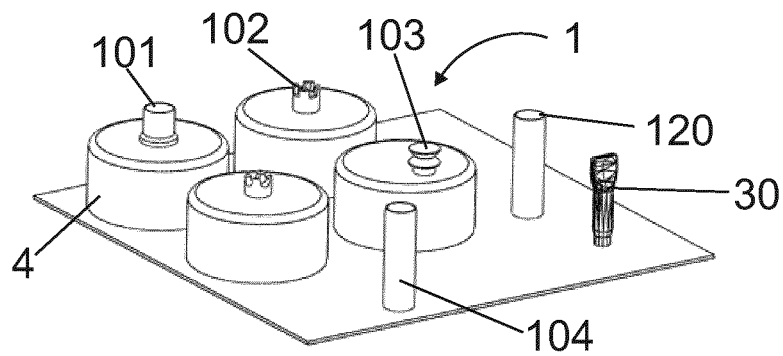
FIG. 7: A schematic perspective view of embodiments of various connecting elements connected to the receiving structure.

FIG. 7 shows schematic perspective views of embodiments of connecting elements connected to the receiving structure, for example, by clicking, gluing, or screwing. The feedthrough 101 creates an opening between the outside of component 90 and a functional body. Here, for example, cables for connection from the photovoltaic module 98 can be passed through. The assembly fitting 102 complements conduits 16 with the receiving element 4. This guarantees, for example, the positional certainty of a capillary tube system. An assembly fitting for yarn placement 103 enables yarn placement and securing relatively to the receiving structure 1 independently of a grid, mainly corresponding to a load profile. Unlike in FIG. 2, it is, therefore, unnecessary to use a prefabricated, orthogonal gridded reinforcement textile. Instead, the yarn of the reinforcement is guided around the assembly fitting 103. In this case, the assembly fittings 103 can be screwed, glued, or welded to the receiving element 4 and positioned freely on the receiving element beforehand. In this regard, see also FIG. 10.

Further connecting elements are shown, such as the assembly fitting 30 (cf. FIG. 1) and the fixing connection 120 (cf. FIG. 6) and, in addition, a feedthrough 101 for contacting external elements (e.g., a photovoltaic module 98, cf. FIG. 6) with one of the functional modules, an assembly fitting 102 for capillary tubes and tubular feedthrough 104 for passing through cables.

Figure 8:
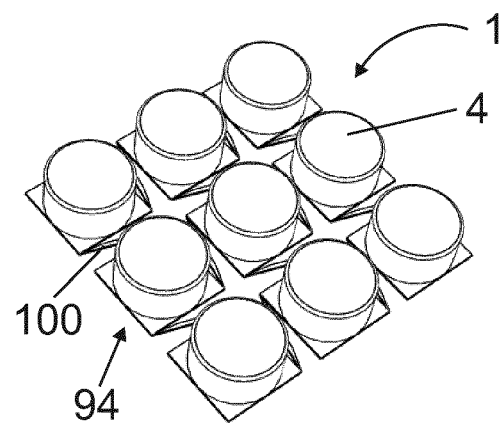
FIGS. 8 and 9: An embodiment of a flexible receiving structure.
Figure 9:
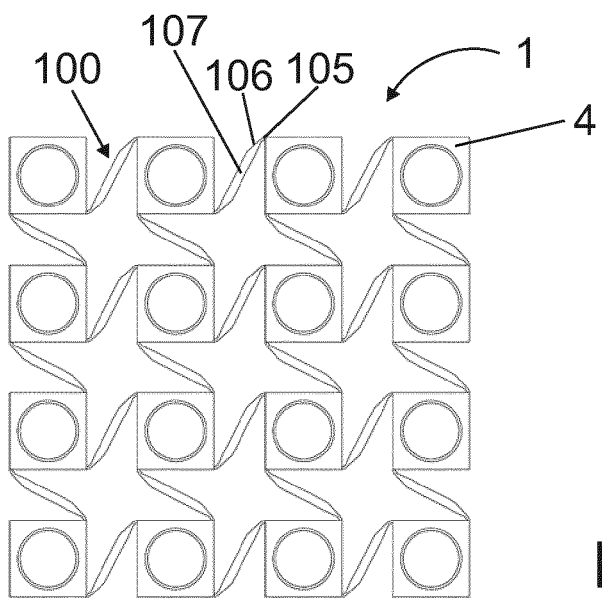

FIG. 8 shows a perspective view, and FIG. 9 is a top view of an embodiment of a flexible receiving structure 1. The receiving elements 4 are connected utilizing webs 100. The webs 100 comprise a pivot connection 105, via which they are hinged connected to the receiving element 4. This pivot connection 105 is a thin connecting surface relative to the web width of receiving elements 4, for example, implemented as a film hinge. Further, the web 100 may deform at the thin portions, which are formed as a more deformable web section 106. At the thick points, the bending-resistant web section 107 remains largely undeformed.

This type of connection allows the receiving structure 1 to be deformed, even into a double-curved surface. At the same time, the receiving elements 4 remain undeformed and align themselves normally or tangentially to the upper side 94. The receiving elements can thus continue to receive functional modules and be provided with connecting elements 30, 101, 102, 103, 104.

Figure 10:
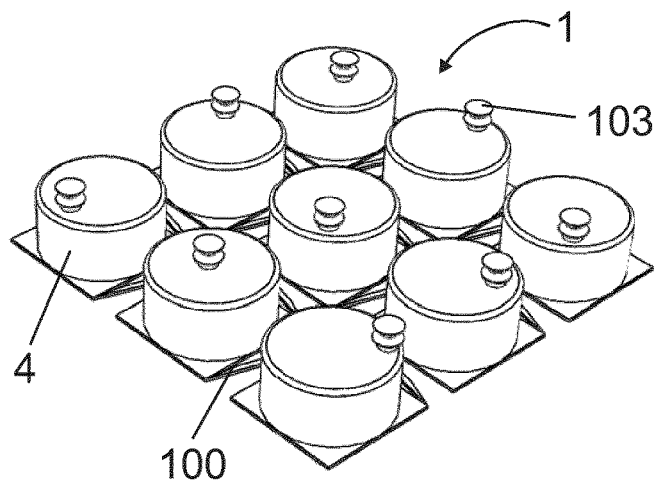
FIG. 10: A schematic perspective view of an embodiment of a flexible take-up structure with elements for free yarn storage.

FIG. 10 shows a perspective view of an embodiment of a receiving structure with webs 100 between the receiving elements 4 and 103 for free yarn placement. This enables the production of multi-curved components 90 with simultaneous free reinforcement layout.

Figure 11:
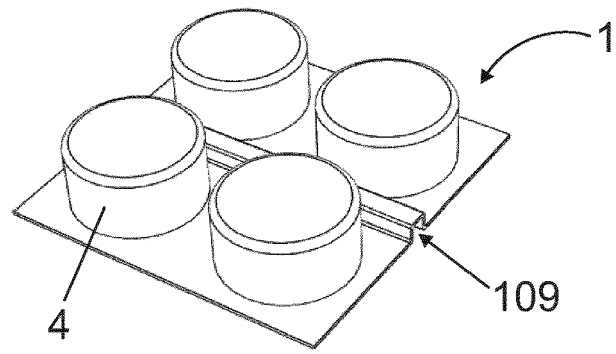
FIG. 11: A schematic perspective view of an embodiment of a receiving structure with cable duct

FIG. 11 shows a perspective view of a mounting structure 1 with an integrated cable duct 109, which can be inserted into the mounting structure 1, for example, during the deep drawing process. Cable duct 109 allows cables or conduits to be routed above the receiving structure 1. The cables and conduits 16 integrated in this way connect the functional modules to one another. This represents an alternative to connection via a textile layer or conduits 16 embedded in the matrix material. The cables and conduits laid in the cable duct 109 are therefore still accessible after concreting, making it possible to extend, replace or renew the cables and conduits 16 even after completion.

Figure 12:
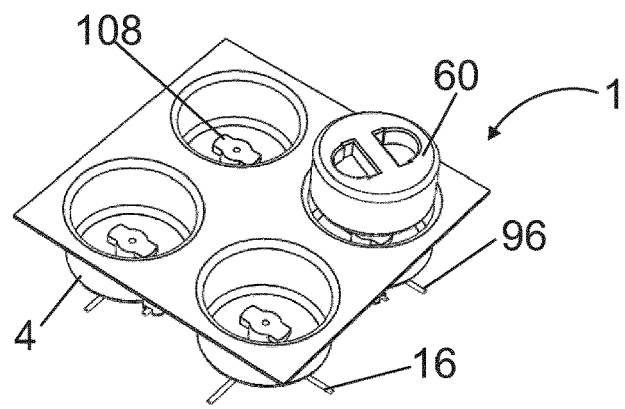
FIG. 12: A schematic perspective view of a further embodiment of a receiving structure with functional module and receiving element.

FIG. 12 shows a perspective view of a further embodiment of a receiving structure 1. With this embodiment of the receiving elements 4, the functional modules, here exemplarily the functional module 60, can be contacted with the textile or other functional modules, which are located on the underside of the receiving structure 1. Furthermore, the functional modules, here the functional module 60, are thereby mechanically connected to the receiving structure 1.

The functional modules, in this case, the functional module 60, are designed in such a way that they can be screwed into the receiving element 4 and locked using an interlock 108. This creates a mechanical connection that can also include reinforcement 96. Furthermore, according to an advantageous further development, the interlock 108 enables electrical contacting to the conduits 16 located on the underside of the receiving structure 1, provided, for example, for textile heating, for a functional module with sensor or a function module 89 for receiving a photovoltaic module 98 (cf. FIG. 6).

LIST OF REFERENCE NUMERALS

1 Receiving structure
4 Receiving element
6 Receiving space
10 Opening
12 Module lock
14 Contact
16 Conduit
18 Collector tube
30 Connecting element, assembly fitting
40 Position securer
60 Functional module for storing electrical energy
65 Functional module for thermal energy storage
75 Functional module for thermal energy generation
84 Functional module with a control device
89 Functional module as contact module
90 Component
94 Upper side
96 Reinforcement
98 Auxiliary device, photovoltaic module
100 Web
101 Connecting element, feedthrough for contacting external elements
102 Connecting element, assembly fitting for capillary tubes
103 Connecting element, assembly fitting for free yarn deposit
104 Connecting element, feedthrough
105 Pivot connection
106 deformable web section
107 Bending-resistant web section
108 Interlock
109 Cable duct
120 Fixing connection
A Distance
M Mesh size

The invention claimed is:

1. A receiving structure (1) which is provided for casting into a matrix material of a component (90) and has a plurality of receiving elements (4) which projects out of the receiving structure (1) in such a way that it projects at least partially into the matrix material, characterized in that the plurality of receiving elements (4) has a receiving space (6) which has, an opening (10) facing an upper surface (94) of the component (90), which is accessible from outside and through which at least one functional module can be guided for insertion into the receiving space (6), wherein the receiving space (6) is universally designed for receiving and connecting the at least one functional module, wherein at least one position securer (40) is provided for securing the position of a reinforcement (96) relative to the receiving structure (1), and wherein the receiving structure (1) substantially predetermines the outer shape of at least one surface of the component (90), wherein the receiving structure (1) comprises the plurality of receiving elements (4) hinged connected to each other by at least one web (100), such that the receiving structure (1) is curved several times and the plurality of receiving elements (4) assume a substantially tangential position with respect to a curved surface but do not undergo any deformation themselves.

2. The receiving structure according to claim 1, wherein the component (90) comprises the reinforcement (96) having yarns which form a rectangular grid and wherein the distance (A) of centers of the plurality of receiving elements (4) is a multiple of a mesh size (M) of the rectangular grid.

3. The receiving structure according to claim 1, wherein a releasable mechanical connection (12) is provided between the receiving structure (1) and the at least one functional module as well as a contacting of the at least one functional module with at least one conduit (16).

4. The receiving structure of claim 3, wherein the at least one conduit (16) is formed as a universal conduit, an empty universal conduit for receiving other conduits (16), and/or the reinforcement (96).

5. The receiving structure according to claim 2, wherein at least one assembly fitting (30) and/or the at least one position securer (40) is provided, wherein the at least one assembly fitting (30) connected to the receiving structure (1) embedded in the matrix material enables mounting of the component (90) to a superordinate structure and transport, wherein the at least one position securer (40) connected to the receiving structure (1) enables positional certainty and guiding of the reinforcement (96) and/or at least one conduit (16).

6. The receiving structure according to claim 1, wherein the at least one functional module (65) is designed as a storage for electrical energy or thermal energy.

7. The receiving structure according to claim 1, wherein the at least one functional module is configured as a connector module comprising an external output for carrying fluids, information, or power to the outside via the external output.

8. The receiving structure according to claim 1, wherein the at least one functional module is configured as a contact module and is configured for easy contacting of an auxiliary device (98) to be connected to the component (90) after being molded into the matrix material.

9. The receiving structure according to claim 1, wherein the at least one functional module is comprised of a module for electrical energy generation.

10. The receiving structure according to claim 1, wherein the at least one functional module is comprised of a module for thermal energy generation.

11. The receiving structure according to claim 1, wherein the at least one functional module comprises at least one sensor for detecting temperature, humidity or other physical variables and the at least one functional module comprises a control device which is designed to process data detected by the at least one sensor, and information received or to be transmitted by the at least one sensor, and to process the data received or to be transmitted by the at least one sensor.

12. The receiving structure according to claim 1, wherein the at least one function module comprises a control device which is designed to process the data detected by the at least one sensor, and the received information or the information to be transmitted, and to control or regulate the function of further functional modules.

13. The receiving structure according to claim 1, wherein the at least one functional module (86) comprises a signaler.

* * * * *